United States Patent [19]

Rieger

[11] 4,123,284
[45] Oct. 31, 1978

[54] POROUS CERAMIC BODIES
[75] Inventor: Konrad C. Rieger, New Fairfield, Conn.
[73] Assignee: R. T. Vanderbilt Company, Inc., Norwalk, Conn.
[21] Appl. No.: 794,425
[22] Filed: May 6, 1977
[51] Int. Cl.² ............... C04B 35/14; C04B 35/44
[52] U.S. Cl. ...................... 106/40 R; 106/65; 106/67
[58] Field of Search ............ 106/40 R, 65, 67, 68

[56] References Cited

U.S. PATENT DOCUMENTS

| | | | |
|---|---|---|---|
| 2,499,229 | 2/1950 | Rankine | 106/41 |
| 2,543,548 | 2/1951 | Henry et al. | 106/69 |
| 3,199,992 | 8/1965 | Moffitt | 106/40 R |

OTHER PUBLICATIONS

Chemical Abstracts vol. 73 Abstract No. 38,206s German Offen. 1,954,399 by Rankine 6/11/1970.
Chemical Abstracts vol. 71, Abstract No. 116093c.

*Primary Examiner*—Winston A. Douglas
*Assistant Examiner*—J. V. Howard
*Attorney, Agent, or Firm*—Rasma B. Balodis

[57] ABSTRACT

Light weight porous ceramic bodies characterized by uniform porosity are prepared by forming an aqueous slurry of a mixture of pyrophyllite and clay having a solids content of 35 to 60 percent, mechanically agitating, drying and firing. Optionally, the composition may contain kyanite.

14 Claims, No Drawings

POROUS CERAMIC BODIES

BACKGROUND OF THE INVENTION

1. Field of the Invention

This invention concerns light weight porous ceramics having uniform pore distribution and a method for preparing same.

2. Description of the Prior Art

Many different ceramic compositions and preparation methods have been proposed for manufacturing light weight porous ceramic bodies for use in thermal insulation, sound insulation, refractories and furnace linings. One of the problems encountered has been the development of the necessary internal porosity. Properties, as for example, mechanical strength, compressive strength, heat conductivity, heat storage, thermal shock resistance and volumetric stability are related to the porosity of the ceramic body.

Prior art methods heretofore used for forming porous bodies of the character described can be classified as follows:

1. Inclusion of an organic material which is combusted during firing of the ceramic body, thus creating voids.
2. Inclusion of a material which generates gas bubbles either by chemical reaction or volatilization.
3. Fire bloating in which impure raw materials as for example clays and shales give off gases during firing.
4. Inclusion of heat expandable exfoliated minerals.
5. Air jet dispersion into the mass.
6. Mechanical agitation of a mass containing foaming agents or surfactants to hold air bubbles entrapped into the mass form the surrounding atmosphere or combinations of the above as for example in U.S. Pat. No. 2,318,574.

One of the raw materials used for preparing light weight porous ceramic bodies is pyrophyllite. However, pyrophyllite processed by prior art methods resulted in brittle porous structures of low compression strength and mechanical strength which is unsatisfactory for most long term, high temperature applications. This condition, in part, has been due to the difficulty in controlling the development of uniform voids throughout the entire structure. In the past, the disadvantages have been overcome by treating the pyrophyllite as for example by calcining in U.S. Pat. No. 2,543,548 or selection of specific type of pyrophyllite fractions described in U.S. Pat. No. 3,199,992. Another practice has been the addition of a variety of mineral binders as described in U.S. Pat. No. 2,499,229, U.S. Pat. No. 3,199,992, U.S. Pat. No. 3,365,318, British Pat. No. 1,082,082, and German Offen. No. 1,954,399.

It has now been discovered that light weight porous ceramics of uniform pore distribution can be prepared by yet another type of process. This process comprises an inexpensive, simple mechanical mixing method under controlled conditions and without the use of chemical foaming or surface-active agents.

SUMMARY OF THE INVENTION

According to the invention, there are provided porous ceramic products comprising about 100 to 10 percent by weight pyrophyllite and about 90 to 0 percent by weight clay selected from the group consisting of china clay and ball clay. The ceramic may further comprise about 1 to 60 percent by weight kyanite. The ceramic may optionally contain a pore structure stabilizing agent.

According to another aspect of the invention, there is provided a method for manufacturing said porous ceramic product. Briefly, the process comprises adding about 35 to 60 percent by weight of a mixture comprising about 100 to 10 percent by weight pyrophyllite and about 90 to 0 percent by weight clay to about 40 to 65 percent by weight water, forming a slurry by mechanical agitation, curing at 100°-115° C. and subsequently firing.

According to another aspect of the invention, about 10 to 60 percent by weight based on the total solids content of kyanite is added to the mixture.

DETAILED DESCRIPTION OF THE INVENTION

According to the invention, porous ceramic bodies are produced by a simple mechanical agitation method. Although all theoretical aspects have not been fully investigated, hypothetically, voids within the mass are formed as a result of the hydrophobic nature of pyrophyllite and possibly, interaction of surface charges associated thereon under certain controlled conditions. It is critical to the process to control the ratio of pyrophyllite to clay and that of the total solids content to water.

Furthermore, pore formation is affected by the blending conditions. The hydrophobic character of the pyrophyllite which imparts self-foaming properties to the ceramic composition is influenced by the blending speed. High blending speeds decrease the overall foam structure and uniformity, as well as cause formation of isolated large pores due to entrapment of air bubbles. Therefore, it is essential to the invention that the hydrophobic character of the pyrophyllite is preserved during the slurry forming step. This is accomplished by agitating at low speeds so that low shear conditions are maintained throughout the process.

The blending time will not affect the uniformity of the pore structure. However, the pores becomes finer with increased blending times and consequently, denser bodies will be obtained.

A typical batch composition will consist of about 40 to 65 percent by weight and preferably about 44 to 60 percent by weight of water and about 60 to 35 percent by weight and preferably about 56 to 40 percent by weight based on the weight of total solids. The solids comprise a mixture of about 10 to 100 percent by weight and preferably about 50 to 80 percent by weight of pyrophyllite and about 90 to 0 percent by weight and preferably 50 to 20 percent by weight of clay.

The amount of water required to produce pores is also somewhat dependent on the particle size of the pyrophyllite. An increase in fines will increase the water requirement. The particle size of the clay component is not critical. Both fine and coarse clay may be used without affecting the development of voids and uniformity of pore distribution in the final product.

The water requirement can be reduced without affecting the uniformity of the pore distribution by inclusion of about 1 to 60 percent by weight based on the total weight of the solids of kyanite. An advantage to inclusion of kyanite is the reduction of energy requirement in the drying step.

Another advantage is increase in resistance of the fired product to higher service temperatures. Generally, the kyanite-containing products will have somewhat higher densities compared to products containing no kyanite.

The pore distribution and structure as well as the mechanical properties of the cured ceramic product will depend on the ratio of the total solids content to water and the specific mineral mixture used.

The porosity of the product is characterized according to their water absorption properties as measured by the standard procedure of ASTM C-20-73.

A typical ceramic product of the invention will have water absorption of about 25 to 110 percent.

The aqueous mineral mixture may be formed by dispersing the dry material into water by conventional methods. In a preferred embodiment, the dry materials are preblended and then added to the aqueous phase at room temperature. Optionally, warm water may be used.

The slurry may be formed into a final product or structural units, cured in a dryer or by application of any other conventional source of heat as for example high intensity light and subsequently fired by conventional methods.

Curing is conducted at about 100° to 115° C. The firing temperature will depend on the composition of the body and generally, will be about 1000° to 1400° C.

The method of the invention has several advantages over the prior art methods. Since air is not introduced into the mass during the agitation step, that is, the mass is not prefoamed, no special equipment or controls are needed for the agitation or slurry forming step. Secondly, the self-foaming nature of the pyrophyllite-clay slurry under curing conditions renders unnecessary all processing aids such as foaming agents, foaming aids and surface-active substances for enhancing air entrapment into the mass. Thus, the method is relatively inexpensive and pollution free as compared to known methods.

The pyrophyllite ingredient useful to the invention is characterized by fine grained structure or air separated fines having particle size of finer than 100 mesh and preferably, finer than 325 mesh.

Any high pyrophyllite ore may be used.

Particularly preferred are foliated and semimassive forms having low bulk density. Especially preferred are ores having compact bulk density of 50–100 lbs/ft$^3$.

The clay component may be selected from a variety of hydrated aluminum silicate minerals. Particularly preferred are white burning clays as for example kaolin clay or china clay and ball clays. Coarse as well as fine grained type clays may be used.

The physical properties of the kyanite component are not critical to the invention. A powdered variety of kyanite is preferred.

The composition may optionally include a pore structure stabilizing agent as for example lime, silica, borax and gypsum cements. Particularly preferred is plaster of Paris.

The following examples are submitted to further illustrate, but not to limit the scope of the invention. Unless otherwise indicated, all parts and percentages in the specification and claims are based upon weight.

EXAMPLE I

Pyrophyllite and clay were dry-blended and added to water. The mixture was agitated under low sheer conditions in a mixer at a blending speed setting of 5 (Model 6T60 1/20 HP Mixer, Controller Model S-20 manufactured by the G.K. Heller Corporation) for about 1 minute. The formed slurry was poured in a 400 ml. container, cured in a drier at 105° to 115° C. and subsequently fired at 1204° C. (pyrometric cone 11). The ratios of pyrophyllite to clay were varied while the water content was maintained constant as indicated in Table I below.

Typical particle size of the pyrophyllite used is as follows: +45 μm 11.9%, +30 μm 22.3%, +20 μm 37.9%, +15 μm 52.5%, +10 μm 74.5%, +5 μm 77.9%.

The uniformity of the pore distribution from top to bottom was determined by visual examination and rated as follows:

E — excellent — no or very slight degradation of pore structure
G — good — slight degradation of pores towards top
F — fair — some degradation of pores towards top
P — poor — strong degradation of pores towards top.

The percent of water absorption of the specimens was determined according to ASTM C-20-73.

The results compiled in Table I indicate good uniformity of pore distribution of formulations 2 to 6 containing various ratios of pyrophyllite to clay within the scope of the invention. By comparison, the control formulation 1 show no pore structure.

Table I

| Ingredients | Formulation in Parts by Weight | | | | | |
|---|---|---|---|---|---|---|
|  | 1 | 2 | 3 | 4 | 5 | 6 |
| Pyrophyllite Pyrax RG-200[1] | 0 | 20 | 40 | 60 | 80 | 100 |
| China Clay Peerless No. 2[1] | 100 | 80 | 60 | 40 | 20 | 0 |
| Tap Water | 130 | 130 | 130 | 130 | 130 | 130 |
| Physical Properties |  |  |  |  |  |  |
| Pore uniformity | no pore structure | G | E | E | E | E |
| Water absorption, percent | 18.9 | 24.9 | 38.7 | 61.9 | 69.2 | 109.2 |

[1]Manufactured by R. T. Vanderbilt Company, Inc.

EXAMPLE II

Aqueous slurries of pyrophyllite, clay and kyanite in proportions indicated in Table II below were prepared and tested as described in Example I. The results compiled in Table II show that the cured specimens have pore distribution of good to excellent uniformity. The water content of the slurry can be reduced with increased kyanite content without affecting the uniformity of the pore structure of the cured product.

Table II

| Ingredients | Formulation in Parts by Weight | | | | | | |
|---|---|---|---|---|---|---|---|
|  | 7 | 8 | 9 | 10 | 11 | 12 | 13 |
| Pyrophyllite Pyrax RG-200 | 90 | 70 | 50 | 30 | 50 | 60 | 60 |
| China Clay Peerless 10 No. 2 | 10 | 10 | 10 | 20 | 20 | 30 |  |
| Kyanite | 0 | 20 | 40 | 60 | 30 | 20 | 10 |
| Tap Water | 130 | 120 | 110 | 80 | 120 | 125 | 130 |
| Physical Properties |  |  |  |  |  |  |  |
| Pore uniformity | E | E | G | G | E-G | E-G | E-G |
| Water absorption, percent | 96.9 | 87.0 | 69.3 | 46.0 | 55.1 | 66.8 | 69.5 |

EXAMPLE III

Batch formulations containing various amounts of pyrophyllite and ball clay were prepared and tested as described in EXAMPLE I. The results are compiled in Table III below.

TABLE III

| Ingredients | Formulation in Percent by Weight | | | | | |
|---|---|---|---|---|---|---|
| | 14 | 15 | 16 | 17 | 18 | 19 |
| Pyrophyllite Pyrax RG-200 | 50 | 60 | 70 | 70 | 70 | 70 |
| Ball Clay TCP-6[1] | 50 | 40 | 30 | 30 | 30 | 30 |
| Tap Water | 120 | 120 | 120 | 130 | 140 | 150 |
| Physical Properties | | | | | | |
| Pore uniformity | G-E | G-E | G-E | G | G | G |
| Water absorption, percent | 61.8 | 66.7 | 93.5 | 96.8 | 97.0 | 85.0 |

[1]Manufactured by Old Hickory Clay Company

EXAMPLE IV

Pyrophyllite, china clay and as pore structure stabilizer, plaster of Paris was formulated, cured and tested as described in EXAMPLE I. The results are compiled in Table IV.

Table IV

| Ingredients | Formulation in Percent by Weight |
|---|---|
| Pyrophyllite Pyrax RG-200 | 18.8 |
| China Clay Peerless No. 2 | 16.7 |
| Plaster of Paris | 6.3 |
| Tap Water | 58.2 |
| Physical Properties | |
| Pore uniformity | G |

Although the preferred embodiments of the invention have been particularly described, it will be appreciated that various changes, variations and modifications may suggest themselves to those of ordinary skill in the art. It is intended to encompass all such changes, variations and modifications as falling within the scope and spirit of the appended claims.

I claim:

1. A method for producing a porous ceramic product having uniform pore distribution comprising the steps of mixing together about 40 to 65 percent by weight water and about 60 to 35 percent by weight of a mineral mixture comprising about 10 to 100 percent by weight pyrophyllite and about 90 to 0 percent by weight clay selected from the group consisting of china clay and ball clay, agitating the resulting mixture to form a self-foaming slurry, curing and subsequently firing.

2. A method according to claim 1 wherein the mineral mixture further comprises about 1 to 60 percent by weight kyanite and the water content of the slurry is about 50 to 60 percent by weight.

3. A method according to claim 2 which comprises a further step of adding a pore structure stabilizing agent to the slurry.

4. A method for producing a porous ceramic product having uniform pore distribution comprising the steps of mixing together about 54.6 percent by weight water, about 22.7 percent by weight pyrophyllite, about 9.1 percent by weight clay selected from the group consisting of china clay and ball clay, and about 13.6 percent by weight kyanite, agitating the resulting mixture under low shear conditions to form a self-foaming slurry, curing at about 100°-115° C. and subsequently firing.

5. A porous ceramic product having uniform pore distribution and being produced by a process comprising the steps of mixing together about 40 to 65 percent by weight water and about 60 to 35 percent by weight of a mineral mixture comprising about 10 to 100 percent by weight pyrophyllite and about 90 to 0 percent by weight clay selected from the group consisting of china clay and ball clay, agitating the resulting mixture to form a self-foaming slurry, curing and subsequently firing.

6. A ceramic product according to claim 5 wherein the mineral mixture further comprises about 1 to 60 percent by weight kyanite and the water content of the slurry is about 50 to 60 percent by weight.

7. A ceramic product according to claim 6 wherein the mixing step further comprises the addition of a pore structure stabilizing agent.

8. A porous ceramic product having uniform pore distribution and being produced by a process comprising the steps of mixing together about 54.6 percent by weight water, about 22.7 percent by weight pyrophyllite, about 9.1 percent by weight clay selected from the group consisting of china clay and ball clay, and about 13.6 percent by weight kyanite, agitating the resulting mixture under low shear conditions to form a self-foaming slurry, curing at about 100°-115° C. and subsequently firing.

9. A method according to claim 1 which comprises a further step of adding a pore structure stabilizing agent to the slurry.

10. A ceramic product according to claim 5 wherein the mixing step further comprises the addition of a pore structure stabilizing agent.

11. A curable composition adopted for making porous ceramic product having uniform pore distribution and comprising about 40 to 65 percent by weight water and 60 to 35 percent by weight of a mineral mixture comprising about 10 to 100 percent by weight pyrophyllite and about 90 to 0 percent by weight clay selected from the group consisting of china clay and ball clay.

12. A composition according to claim 11 wherein the mineral mixture further comprises about 1 to 60 percent by weight kyanite.

13. A composition according to claim 12 which further comprises a pore structure stabilizing agent.

14. A composition according to claim 11 which further comprises a pore structure stabilizing agent.

* * * * *

UNITED STATES PATENT AND TRADEMARK OFFICE
CERTIFICATE OF CORRECTION

PATENT NO. : 4,123,284
DATED : October 31, 1978
INVENTOR(S) : Konrad C. Rieger

It is certified that error appears in the above-identified patent and that said Letters Patent are hereby corrected as shown below:

Column 1, line 34 "the mass form" should be --the mass from--;

Column 4, lines 55 to 57 "China Clay Peerless  10   10   10   20   20   30   10   NO. 2"
     should be
--China Clay Peerless No. 2   10   10   10   10   20   20   30--.

Signed and Sealed this

*Twenty-sixth* Day of *June 1979*

[SEAL]

Attest:

RUTH C. MASON
*Attesting Officer*

DONALD W. BANNER
*Commissioner of Patents and Trademarks*